United States Patent
Goodrich et al.

(10) Patent No.: US 6,911,267 B1
(45) Date of Patent: *Jun. 28, 2005

(54) BRAZING SHEET AND METHOD

(75) Inventors: H. Scott Goodrich, Millwood, WV (US); Scott L. Palmer, Parkersburg, WV (US); Gregory R. Johnson, Ripley, WV (US); Zayna M. Connor, Ripley, WV (US)

(73) Assignee: Pechiney Rolled Products, Ravenswood, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/658,791

(22) Filed: Sep. 10, 2003

Related U.S. Application Data

(63) Continuation of application No. 10/046,152, filed on Jan. 16, 2002, now Pat. No. 6,667,115.
(60) Provisional application No. 60/261,161, filed on Jan. 16, 2001.

(51) Int. Cl.[7] .......................... B32B 15/18; B32B 31/00
(52) U.S. Cl. ...................... 428/654; 428/924; 428/933; 165/133; 165/180; 165/905
(58) Field of Search ................................ 428/654, 924, 428/933; 165/133, 180, 905

(56) References Cited

U.S. PATENT DOCUMENTS 6,667,115 B2 * 12/2003 Goodrich et al. ........... 428/654

OTHER PUBLICATIONS

Anna Ortnas, et al. "Sagging Resistance of Braze Clad Fin Material for Evaporators and Condensers" Vehicle Heat Exchanger and Transfer Design, No. 960246, 1996, pp. 11–16, no month given.

J. J. Garcia, et al., "Internal/Corrosion/Erosion Testing of Welding Aluminium Radiator Tubes for Passenger Cars and Heavy Duty Trucks" ImechE, 1995, pp. 257–267, no month given.

S. Palmer, "Internal Corrosion Testing of Aluminum Radiator Tube Alloys" Century Aluminum Corporation, pp. 1–19, no date.

* cited by examiner

*Primary Examiner*—Robert R. Koehler
(74) *Attorney, Agent, or Firm*—Connolly Bove Lodge & Hutz LLP

(57) ABSTRACT

The present invention is directed to a brazing sheet comprising an aluminum 3xxx series core alloy wherein at least one side thereof is provided with an aluminum clad material comprising from 0.7–2.0% Mn and 0.7–3.0.0% Zn, wherein the clad is capable of being used as an Inner-liner of a heat exchange product. In one embodiment one side of the core alloy is provided a material that comprises from 0.7–2.0% Mn and 0.7–3.0% Zn and the other side of the core is provided with an aluminum alloy comprising at least 5.5% Si. Thee are further provided methods for preparing brazing sheets as described herein as well as methods for use of brazing sheet materials including as tube stock and as heat exchangers, as well as other applications.

15 Claims, 9 Drawing Sheets

(a) HF etch, 200 X (b) Barker's etch, 100 X

BRAZING SHEET AND METHOD

CROSS-REFERENCE TO RELATED APPLICATIONS

This application is a continuation of U.S. Ser. No. 10/046,152, filed Jan. 16, 2002, now U.S. Pat. No. 6,667,115 which in turn claims priority under 35 U.S.C. 119(e) from Provisional Application Ser. No. 60/261,161, filed Jan. 16, 2001.

BACKGROUND OF THE INVENTION

1. Field of the Invention

The present invention relates generally to aluminum alloy brazing sheet materials including brazing sheet tube stock, and more particularly to erosion/corrosion resistant clad aluminum alloy brazing sheet materials as well as to methods for their manufacture and use.

2. Description of Related Art

In the recent past, automobile manufacturers have increasingly turned to employing aluminum radiators, heater cores, evaporators, condensers and other heat exchangers due to aluminum's superior properties, especially in terms of strength, durability, weight and corrosion resistance. Aluminum heat exchanger materials must meet several demanding properties in order to be acceptable for long term use in vehicles including good heat transfer, high strength to withstand internal pressures, corrosion resistance to cooling fluids on the interior of the units and external corrosion resistance to salt and other road chemicals.

Aluminum heat exchangers are typically formed by brazing together parts fabricated from clad aluminum sheet components in which one of the clad materials is a low melting aluminum alloy, generally made from 4xxx series aluminum.

The tube stock material is generally formed of brazing sheet material stock. The selection of the composition of the tube stock is typically made with different considerations in mind than those that are relevant in selecting the composition of clad materials since the inner clad portion of the tube is exposed to antifreeze, water and other fluids flowing through the interior of the tubes while the exterior of the tubes are exposed to the same conditions as the fins since they are positioned on the exterior of the radiator or heat exchanger. Braze clad fins have been formed, for example, from AA3003. See, i.e. Örtnäs et al. *Sagging Resistance of Braze Clad Fin Material for Evaporators and Condensers* SAE International Congress & Exposition, Detroit, Mich., No. 960246 pp. 11–16 (1996).

Brazing sheet materials for heat exchangers can be comprised of multiple layers. See, e.g. U.S. Pat. No. 5,292,595 that discloses a 3 layered clad material. Typically, the aluminum alloy brazing stock material comprises an aluminum core alloy that has been clad on one or both sides with other aluminum based alloys. If clad on both sides, the cladding alloys can be of different compositions and thicknesses. The composition of the core and the clad are carefully selected and are important to the properties of the resulting brazing sheet material. In the past, materials such as AA3005 and AA3003 (0.05% Cu, approximately 1% Mn, up to 0.6% Si and up to 0.7% Fe) have been used as the core alloy for such things as radiator tube stock and their inner surfaces have been covered with a clad layer of another aluminum alloy such as AA7072, for example. AA7072 is a lower strength alloy that includes approximately 1–1.5% Zn so that the inner liner acts to reduce corrosion of the core alloy through Galvanic protection.

However, substantial problems exist with corrosion of traditional tube stock core alloys from both the interior and exterior of the tube. Particularly, problems arise on the inside of the tubes due to erosion/corrosion of the clad layer which occurs due to the extremely high velocity of coolant that is moving through the tubes. Garcia et al. in *"Internal Corrosion/Erosion Testing of Welded Aluminum Radiator Tubes for Passenger Cars and Heavy Duty Trucks,"* IMechE, pp. 257–265 (1995) investigated the properties of the internal corrosion and erosion/corrosion associated with the interior of radiator tubes as a function of fluid flow.

Moreover, in recent years, the popularity of sport utility vehicles ("SUV's"), multi-passenger vehicles and heavy trucks has increased as well as additional options that consume engine power, which places heavier demands on the heat exchanger. In order to adequately heat/cool these larger scale vehicles, the vehicle manufacturers have merely increased flow rate of the coolant through the heat exchanger so as to provide more cooling/heating with the same size unit. This is because the size of the heat exchanger may already be at its maximum size, and as such, the only way to achieve adequate results is to increase the flow of fluid through the unit. Again, the increase in fluid flowing through the tubes will, in turn, change the dynamics of the interior of the tubes and will even erode the interior due to high pressures and flow rates over time.

It would be desirable to find a suitable brazing sheet material and associated method whereby the size of the heat exchanger can be minimized, while still achieving acceptable internal erosion/corrosion resistance properties.

SUMMARY OF THE INVENTION

In accordance with these and other objects, there is provided a brazing sheet composite comprising an aluminum core alloy wherein at least one side thereof is provided with an aluminum clad material comprising from 0.7–2.0% Mn and 0.7–3.0% Zn, wherein the clad is capable of being used as the inner-liner of a heat exchanger product such as radiator or heater core tubes. In one embodiment, one side of the core is provided with a material that comprises from 0.7–2.0% Mn and 0.7–3.0% Zn and the other side of the composite is provided with a clad aluminum alloy comprising at least 5.5% Si for brazing purposes.

There are further provided methods for preparing brazing sheets as described herein as well as methods for use of brazing sheet materials including as tube stock and heat exchangers as well as further applications.

Additional objects, features and advantages of the invention will be set forth in the description that follows, and in part will be obvious from the description, or may be learned by practice of the invention. The objects, features and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a pres

DETAILED DESCRIPTION OF A PREFERRED EMBODIMENT

Internal corrosion problems are different than external corrosion problems since the external portion of the heat exchanger is exposed to ambient air and road chemicals such as salt, sulfur, fumes, and so on. The internal side of the heat exchanger is not exposed to ambient air, but only to the pressurized liquids, i.e., coolant/antifreeze that circulates through the heat exchanger. The system is closed and therefore, the factors that affect the corrosion problems of the external side of the heat exchanger are not necessarily present. Problems associated with the internal aspects of erosion/corrosion were investigated in Garcia et al. supra, as well as Palmer et al. *"Internal Corrosion Testing of Aluminum Radiator Tube Alloys"* NACE International Paper No. 547 (1998). The content of both these documents is incorporated herein by reference in their entireties.

Figure 1:
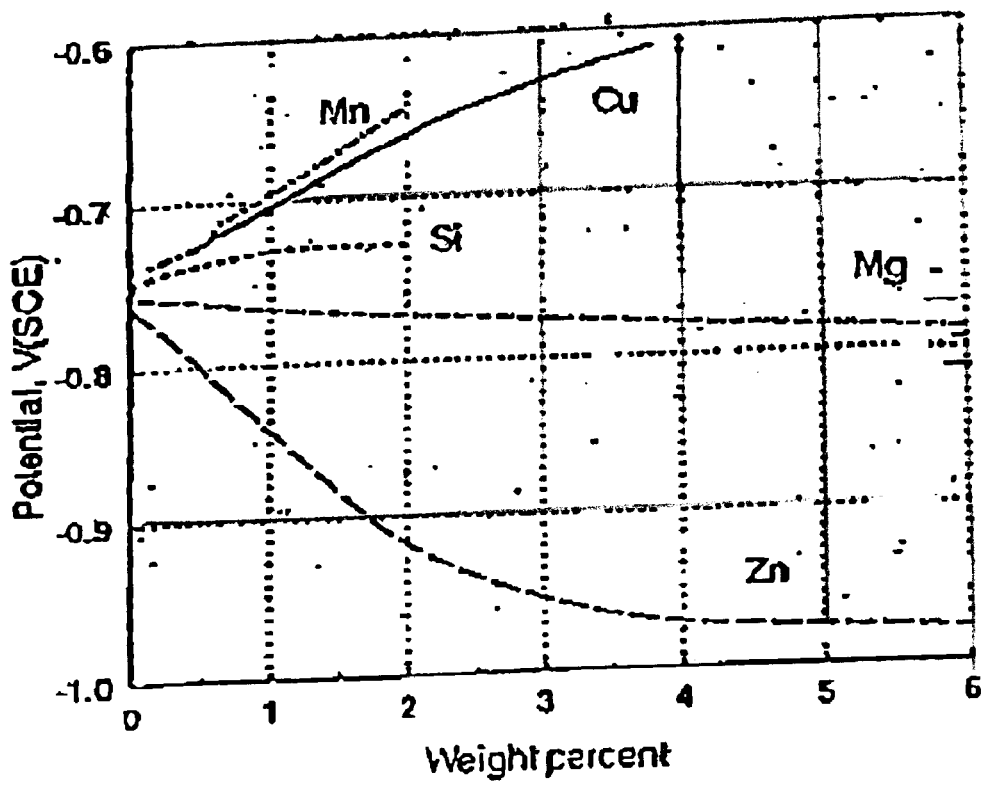
- FIG. 1 is a graph showing the effect of alloying elements on the solution potential of aluminum.
Figure 2:
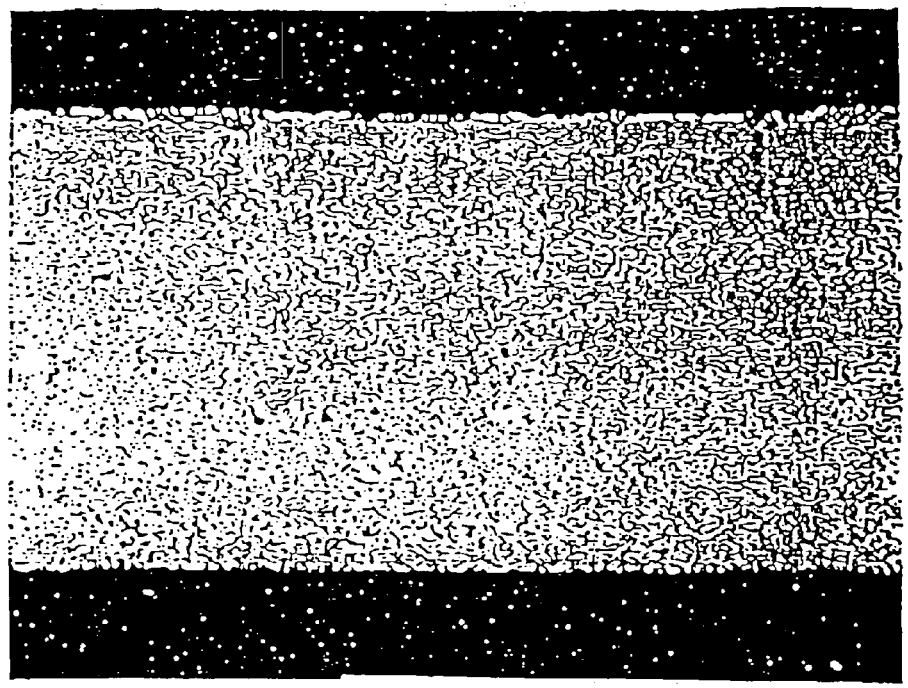
FIG. 2 shows post-braze microstructure and grain structure of a material of the present invention.
Figure 2:
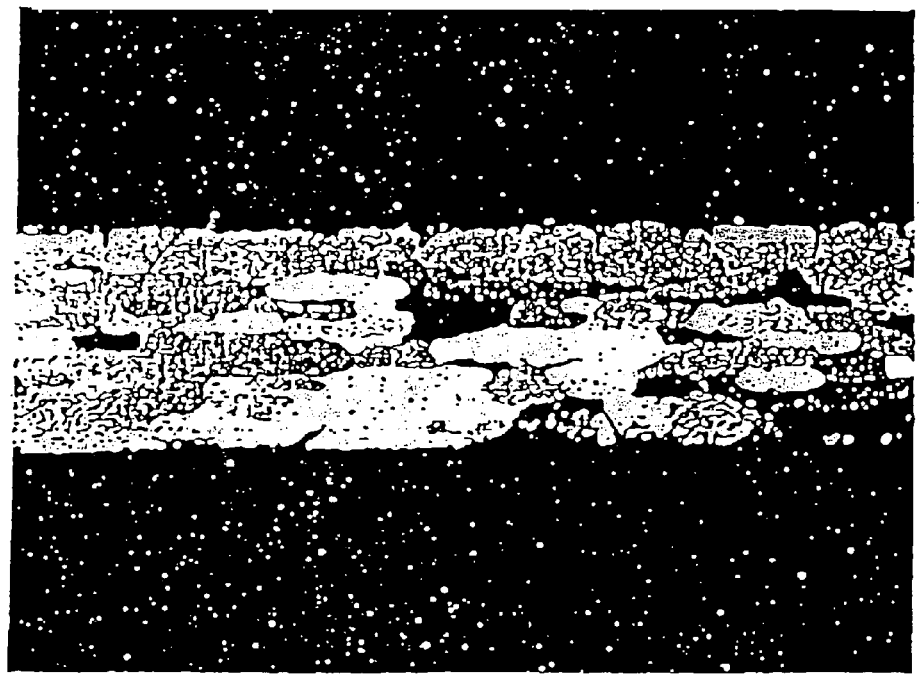
Figure 3:
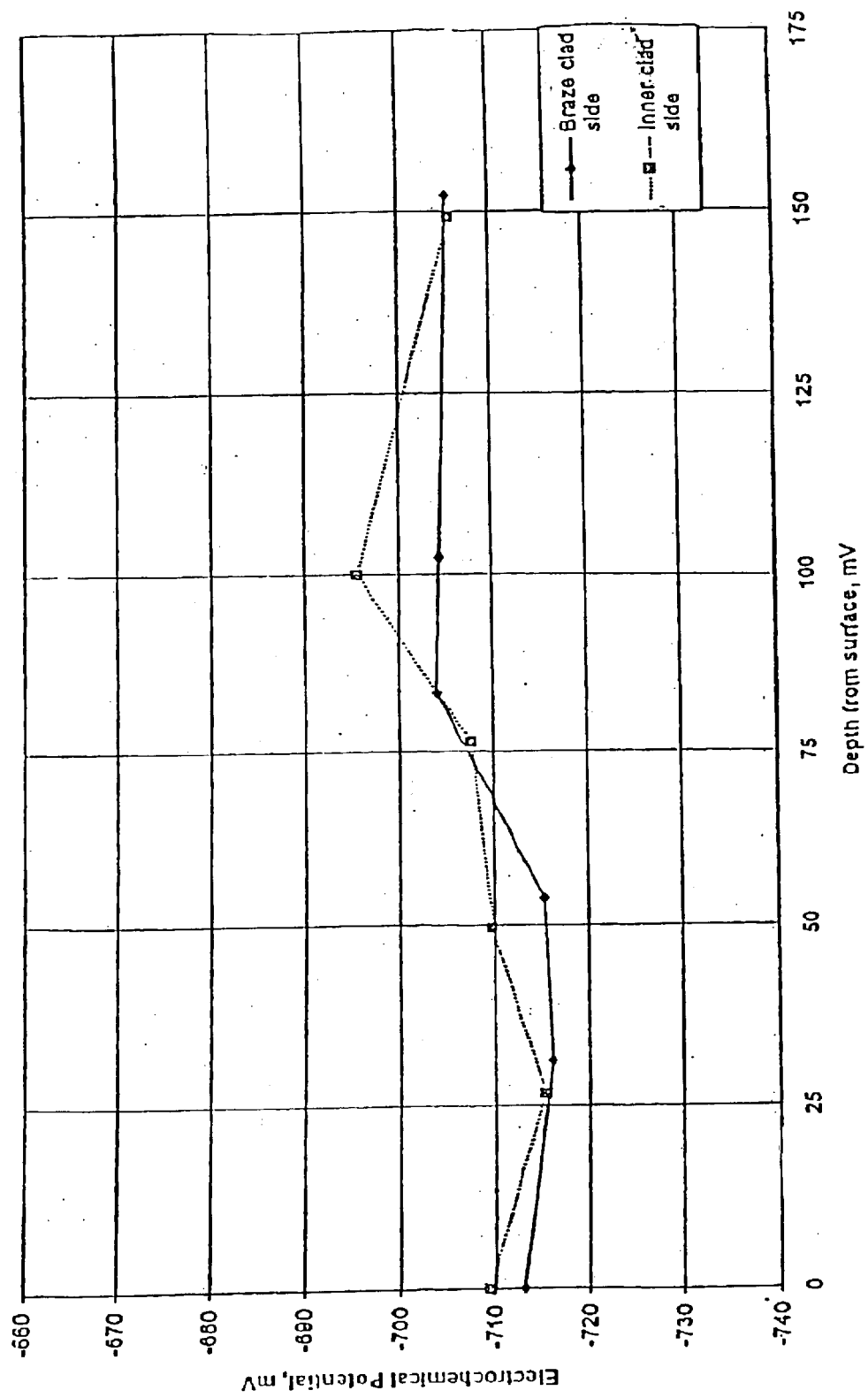
FIG. 3 shows corrosion potential profiles of a material according to the present invention.
Figure 4:
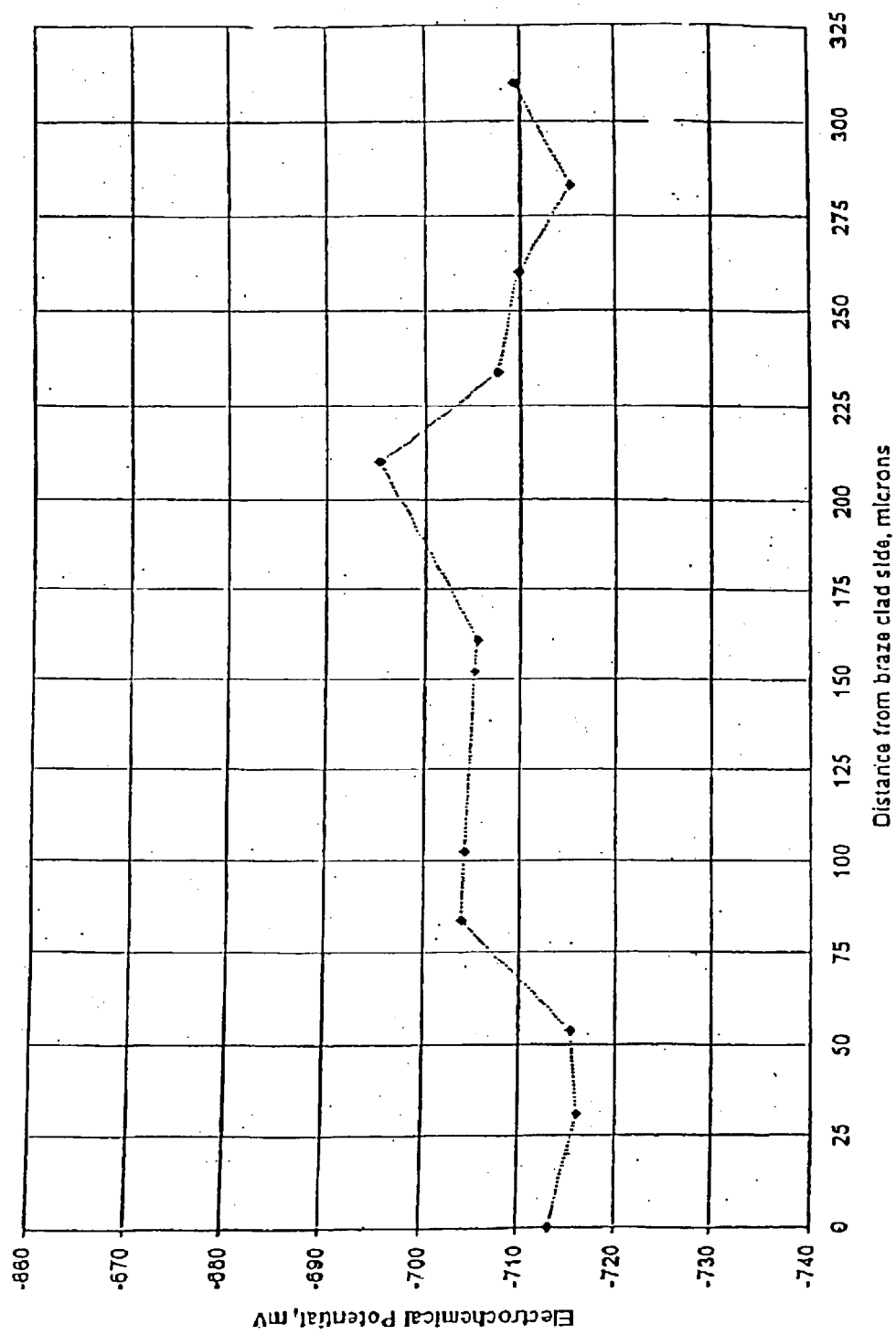
FIG. 4 also shows corrosion potential profiles of a material according to the present invention.

There are several aspects to internal corrosion of heat exchanger materials. First, there is Galvanic protection which can be facilitated by the addition of zinc (Zn) to clad aluminum alloy. This will reduce the solution potential of the clad relative to the core material so that it will corrode in preference to the core. FIG. 1 describes the effect of alloying elements on the solution potential of aluminum in salt/hydrogen peroxide solution. As can be seen from FIG. 1, the addition of Mn, Cu, and Si all raise the solution potential and thus, make the alloy more cathodic. The addition of zinc to aluminum lowers the solution potential, while magnesium slightly lowers the solution potential, making the alloy more anodic. In order to deal with Galvanic corrosion, either some element must be included to counteract the effect of the lowering of solution potential contributed by the alloying elements, or alternatively, a clad or fin stock that corrodes first to protect the core must be chosen. It is desirable in many instances to include an inner clad layer that has a relative solution potential difference when compared to the core of at least 20–25 mVolts. If the difference is smaller than about 20 mVolts, the inner-liner won't have as desirable of an effect in acting as an anode with respect to the core; if the difference is larger than about 50–100 mVolts, then the clad may corrode too quickly.

A second aspect of corrosion associated with heat exchanger materials is pitting corrosion. Pitting initiation in the clad is largely controlled by the potential difference between the aluminum matrix and the coarse intermetallic second phase particles. Measuring potential differences between second phase particles and their surrounding matrix is very difficult. Table 1 lists the solution potentials in salt/hydrogen peroxide solution for several second-phase constituents in aluminum along with several other aluminum alloys for comparison.

TABLE 1

Potential of several aluminum alloys and second-phase particles

| Alloy/Second-Phase Particle | Potential, V(SCE) |
|---|---|
| $Al_3Fe$ | −0.47 |
| $Al_2Cu$ | −0.64 |
| Alloy 1100/3003 | −0.74 |
| Alloy 7075-T6 | −0.74 |
| Alloy 3004 | −0.75 |
| $Al_6Mn$ | −0.76 |
| Alloy 7072 | −0.87 |
| $Al_8Mg_5$ | −1.15 |

Intermetallics that are either cathodic or anodic with respect to the matrix could result in localized pits. When the particle is cathodic to the matrix, the surrounding matrix will undergo preferential dissolution and the particle can be swept away leaving a pit that can continue to propagate. If the particle is anodic to the matrix, the particle itself will undergo dissolution leaving a pit in its place, which again, can propagate further. Pit propagation may also be influenced by the potential difference between core and clad. For example, iron (Fe) intermetallics have a large potential difference with respect to the aluminum matrix and will thus be sites for pitting corrosion. The addition of manganese (Mn) to the clad alloy, for example, will serve to reduce the occurrence of pitting, because the manganese precipitates will absorb the iron in the alloy to form an intermetallic manganese/iron compound that is characterized by an electrode potential very close to that of the aluminum matrix. This reduces the tendency of the aluminum core to pit.

A third aspect to corrosion relates to the erosion/corrosion effect of the cooling fluid through the heat exchanger due to the inherently high velocity of the fluid. To reduce this erosion/corrosion effect, it would be desirable to have a high strength material used as the clad so as to minimize breakdown of the clad layer over time. The inclusion of a high strength material as the clad would also serve to reduce the overall weight of the heat exchanger since the clad material itself would function to increase tube strength. With all this in mind, the present invention provides a brazing sheet and associated methods whereby the inner clad that is exposed to the coolant and high flow rates and pressures associated therewith, has a composition that still provides corrosion resistance without an increase in the overall size of the heat exchanger.

Brazing sheet used in aluminum radiator tubes are composites that generally comprise two or three aluminum alloys that are roll bonded together to form a single sheet. One surface (typically 5–15 percent of the composite thickness) preferably comprises a high-silicon braze clad alloy that serves as the exterior surface to provide filler material for joint formation during the brazing process. This surface can preferably be 0.0005"–0.002", more particularly, 0.0007 or 0.0008"–0.0015" in thickness. The other surface is typically either the exposed core alloy, or an inner alloy (typically 5–15 percent of the composite thickness, namely, advantageously from 0.0005"–0.002", more preferably 0.0008"–0.0015". The inner-liner is advantageously added to improve corrosion resistance to the engine cooling fluids. It is the inner-liner that is included at least in part to maximize problems due to erosion/corrosion in the interior of the tube which develops due to the extremely high velocity of coolant that is moving therethrough.

Figure 5:
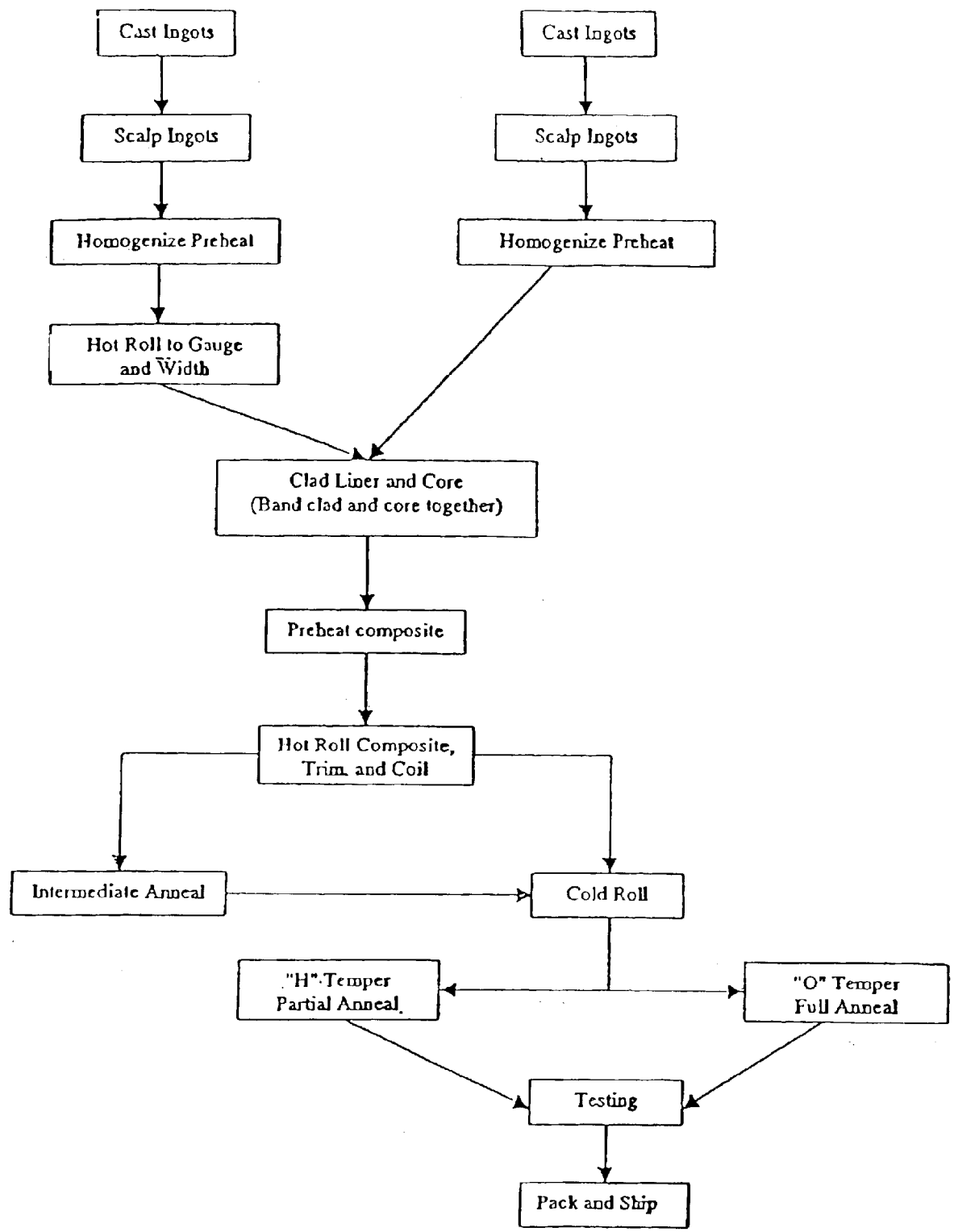
FIG. 5 shows a process flow diagram depicting an acceptable process for preparing brazing sheet materials according to the present invention.

In accordance with the present invention, any aluminum 3xxx series core material can be used. The core can be provided with one or two layered clad materials that can be prepared according to known techniques. For example, the materials can be prepared by the technique shown in FIG. 5 attached hereto. In general, one side of the aluminum composite is clad with an aluminum alloy that preferably comprises Zn in an amount from 0.7–3.0%, more preferably from 1.0–1.8%, and most preferably from 1.3–1.5% and Mn in an amount from 0.7–2.0%, and more preferably from 0.7–1.5%, advantageously from 1.1–1.5%.

After cladding the stock material with one or both layers of cladding, the brazing stock material is rolled using conventional techniques to a desired thickness. After rolling, the brazing stock material can be annealed in a nitrogen atmosphere to eliminate the residual work hardening effects associated with rolling and then the material can be stamped for use in its final configuration, i.e. a heat exchanger. Of course, other uses of the instant material are also possible as would be readily apparent to those of skill in the art. It is particularly advantageous in some embodiments to employ a 4xxx series aluminum clad on the other side of the core such as an aluminum alloy including greater than 5.5% Si, or greater than 6.0%, particularly preferably from 6.0–13% Si or even greater. In a particularly preferred embodiment, the brazing sheet material preferably has the following composition:

|     | Clad Alloy (4xxx series aluminum) | Core (3xxx series al alloy) | Clad Alloy (Inner-liner) |
| --- | --- | --- | --- |
| Si  | 6.0–13%   | 0.6 max   | 0.40 max  |
| Fe  | 0.30 max  | 0.7 max   | 0.7 max   |
| Cu  | 0.10 max  | 0.1–0.7   | 0.05–0.4  |
| Mn  | 0.10 max  | 0.8–1.7   | 0.7–1.5   |
| Mg  | 1.8% max  | 0.15 max  | 0.05 max  |
| Zn  | 0.10 max  | 0.10 max  | 1.0–1.8   |
| Ti  | 0.05 max  | 0.10 max  | 0.10 max  |
| Al  | balance   | balance   | balance   |

In another particularly preferred embodiment, the brazing sheet preferably has the following composition:

|     | Clad Alloy (4xxx series aluminum) | Core (3xxx series al alloy) | Clad Alloy (Inner-liner) |
| --- | --- | --- | --- |
| Si  | 6.0–13%   | 0.6 max   | 0.40 max  |
| Fe  | 0.30 max  | 0.7 max   | 0.7 max   |
| Cu  | 0.10 max  | 0.1–0.7   | 0.05–0.4  |
| Mn  | 0.10 max  | 0.8–1.7   | 0.7–1.5   |
| Mg  | 1.8% max  | 0.15–0.60 | 0.05 max  |
| Zn  | 0.10 max  | 0.10 max  | 1.0–1.8   |
| Ti  | 0.05 max  | 0.10 max  | 0.05 max  |
| Al  | balance   | balance   | balance   |

In other embodiments, as the composition of the core alloy changes, the Zn in the clad inner liner can be modified to obtain the desired electrochemical effect. Moreover, the use of Mn in most embodiments should preferably be greater than 1.0%. By employing Mn in an innerliner clad at an amount of greater than 1.0% on a 3xxx core material, the innerclad unexpectedly outperforms materials wherein Mn is present at lesser amounts.

In some embodiments of the present invention, it is possible to achieve a reduction in the erosion/corrosion resistance, as measured by average pit depth in microns or as maximum pit depth, both as a function of fluid velocity in m/sec of from 5% to up to 50%, up to 90% reduction. In many cases, reductions from 25%–90% can be obtained. Flow rates of up to perhaps even 5 m/sec. or even greater may be used in heat exchanger units. In most cases the flow rates will be up to about 1.0 m/sec. or up to about 2.6 m/sec. In fact, the inventive material in one embodiment has a maximum pit depth that is only about 35% of the maximum depth of the unlined material, and approximately 50% of the maximum pit depth in the material with AA7072 aluminum alloy. This means that when compared with AA7072 aluminum alloy, the inventive material of the present invention has a maximum pit depth at velocities over 0.9 m/sec. that is up to 90% less than the maximum depth associated with an inner liner of AA7072 at the same fluid velocity. According to another embodiment, the average pit depth of the inventive material is about 50% of the average of unlined material and the material is about 85–90% of the average pit depth of material lined with AA7072.

A method of the present invention preferably imparts a reduction from between 10% to 60% of the erosion/corrosion compared to AA7072 as measured by maximum pit depth in microns for fluid velocity rates from 0.9 m/second–3.0 m/second. In addition, a method of the present invention preferably imparts a reduction from between 10% to 60% of the erosion/corrosion compared to AA7072 as measured by average pit depth in microns for fluid velocity rates up to 5.0 m/second. A heat exchanger of the present invention preferably shows substantially no difference in maximum and/or average pit depth after being exposed to fluid velocities from 0.94 m/sec. 2.36 m/sec, for 250 hours. And tube stock of the present invention will preferably have a maximum pit depth of up to 40 microns when exposed to a fluid at a velocity of 2.36 m/sec. for 250 hours.

In any event, reductions in erosion/corrosion on the interior of the tube are completely unexpected and are based largely on the use of a clad material that contains from 0.7–3.0% Zn (advantageously from 1.3–1.5) and from 0.7–2.0% Mn (advantageously from 1.1–1.5% Mn).

EXAMPLES

Example 1

Eight aluminum composite materials were tested using the following as a clad alloy:
1) 7072
2) 1145
3) 3003+Zn
4) 3003-low Fe
5) 3005; and
6) no inner liner The specific inner-liner alloy compositions and core alloy designations for these materials are listed in Table 2 as CA I through CA6, and VB I and VB2. Two commercial aluminum radiators were also tested whose tubes were made from materials CA1 and CA6. The CA designation indicates that the brazing operation was conducted in a controlled atmosphere (anhydrous nitrogen) and the VB designation indicates that the brazing operation was conducted in vacuum. Three additional aluminum composite materials CA7–CA9 are prepared in a similar manner to CA5 and CA6.

These materials, with the exception of alloy CA3 were obtained in the form of prebrazed sheet. Alloy CA3 was received in the form of post brazed tube stock that was removed from a standard aluminum radiator that had been used under experimental conditions for the purpose of this test.

Braze Procedure for the CAB brazed alloys. CA1 through CA6 were brazed in two conditions, namely with a commonly used potassium fluoroaluminite flux on both sides of the sheets and with this flux on the braze clad only with a flux loading of five grams per square meter. Coupons that were brazed with flux on both sides of the sheet simulated the condition in production where flux overspray is deposited on the interior radiator tube surfaces. This usually occurs along the first few inches of the exposed ends of tubes that are sprayed with flux as the radiator travels along a conveyor belt to the brazing furnace. CA7–CA9 are brazed in a manner similar to CA5 and CA6.

All the CAB brazed alloys except CA3 were brazed according to the following braze cycle: braze specimen temperature increased from 450° F. (232° C.) to 1000° F. (538° C.) in ten minutes. Temperature increased again from 1000° F. (535° C.) to 1095° F. (591° C.) in six minutes. Temperature held at 1095° F. (591° C.) for 3 minutes. Temperature decreased from 1095° F. (591° C.) to 1060° F. (571° C.) in one minute, and specimens removed from furnace and air-cooled when temperature falls below 1060° F. (571° C.). The braze sheets placed in the furnace were either 6 inches by 10 inches or 2 inches by 11 inches in size depending on the stock that was available. After furnace brazing, the braze sheets were cut into coupons for testing in a test loop apparatus according to ASTM D2570-91, Standard Test Method for Simulated Service Corrosion Testing of Engine Coolant.

Table 3 sets forth the results of the corrosion damage found for each sample.

TABLE 2

| Alloy Designation | Chemical Composition of clad in weight % | | | | | | | |
|---|---|---|---|---|---|---|---|---|
| | Si | Fe | Cu | Mn | Mg | Zn | Others | % clad |
| CA1 | .06 | .20 | .01 | .01 | .01 | 1.0 | <.05 | 10 |
| CA2 | .06 | .20 | .01 | .01 | .01 | 1.0 | <.05 | 10 |
| CA3 | .07 | .38 | .01 | .01 | .01 | 1.0 | <.05 | 10 |
| CA4 | | | | | NONE | | | |
| CA5 | .06 | .20 | .01 | 1.0 | .01 | .01 | <.05 | 10 |
| CA6 | .06 | .20 | .01 | 1.0 | .01 | 1.0 | <.05 | 10 |
| CA7 | .06 | .20 | .01 | 1.1 | .01 | 1.0 | <.05 | 10 |
| CA8 | .06 | .20 | .01 | 1.3 | .01 | 1.0 | <.05 | 10 |
| CA9 | .06 | .20 | .01 | 1.5 | .01 | 1.0 | <.05 | 10 |
| VB1 | .20 | .53 | .14 | 1.08 | .45 | .04 | <.05 | 10 |
| VB2 | | | | | NONE | | | |

TABLE 3

| | Solution A | | | Solution OY | | |
|---|---|---|---|---|---|---|
| Alloy/Type | Max. Pit Depth (mils) | Pit Diameter (mils) | Comments | Max. Pit Depth (mils) | Pit Diameter (mils) | Comments |
| CA1 | 1.2 | 2 | Minor shallow pitting | 2.5 | 31 | Major and general pitting |
| CA1-U[†] | 1.4 | 1 | Minor pitting | 2.7 | 20 | Major and general pitting |
| CA1-RAD[†] | 1.2 | 1 | Minor pitting | 1.5 | 8 | Major and general pitting |
| CA2 | <0.5 | <0.1 | Very shallow local attack | nf | nf | General pitting |
| CA2-U | <0.5 | <0.1 | Minor pitting | nf | nf | General pitting |
| CA3 | <0.1 | <0.1 | Very minor pitting | 1.9 | 75 | Wide shallow pits |
| CA4 | nf | nf | No corrosion | nf | nf | No corrosion |
| CA4-U | nf | nf | No corrosion | nf | nf | Minor crevice corrosion |
| CA5 | nf | nf | No corrosion | nf | nf | Minor general pitting |
| CA5-U | nf | nf | No corrosion | nf | nf | No corrosion |
| CA6 | nf | nf | No corrosion | nf | nf | No corrosion |
| CA6-U | <0.5 | <0.5 | No corrosion | nf | nf | Minor general pitting |
| CA6-RAD | 0.8 | 0.8 | No corrosion | nf | nf | Minor general pitting |

TABLE 3-continued

| | Solution A | | | Solution OY | | |
|---|---|---|---|---|---|---|
| Alloy/Type | Max. Pit Depth (mils) | Pit Diameter (mils) | Comments | Max. Pit Depth (mils) | Pit Diameter (mils) | Comments |
| VB1 | nf | nf | No corrosion | nf | nf | No corrosion |
| VB2 | nf | nf | No corrosion | nf | nf | Minor crevice corrosion |

†U denotes that flux was not applied to inner liner surface during brazing,
†RAD denotes radiator specimen,
*nf = none found While it can be seen from Table 3 that CA6 that includes 1.0% Mn and 1.0% Zn had very good results in terms of pitting diameter and maximum pit depth, CA7–CA9 would outperform the CA6 material due to the higher percentage of Mn included. A Mn-containing liner performs significantly better than a solely Zn-containing liner. When no inner-liner is used and the core is exposed, there may be satisfactory performance for some aspects but no cathodic protection is present.

Example 2

Figure 6:
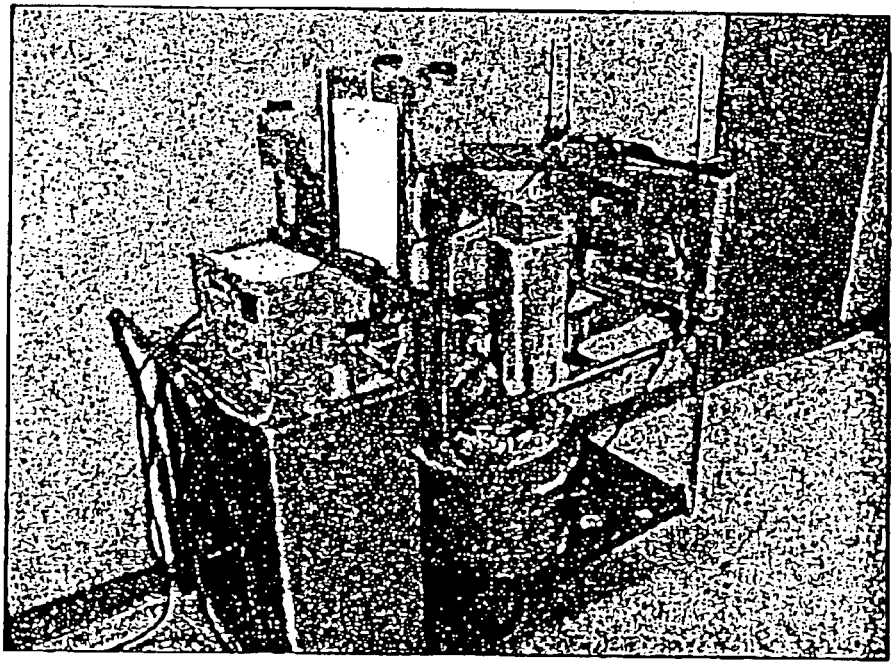
FIG. 6 shows an acceptable process test apparatus for measuring internal corrosion/erosion of heat exchange materials.
Figure 7:
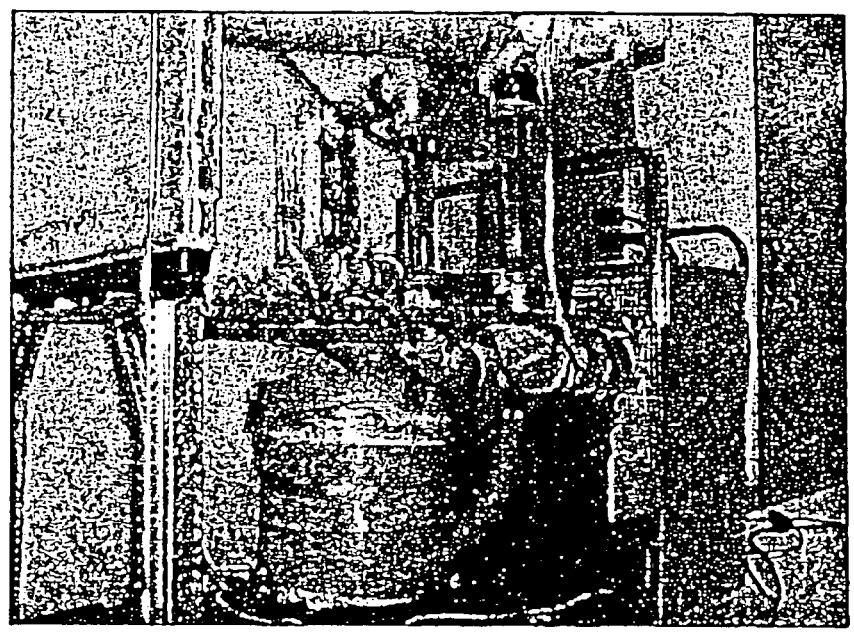
FIG. 7 shows another view of acceptable process test apparatus for measuring internal corrosion/erosion of heat exchange materials.

FIGS. 6 and 7 show examples of test equipment that include methodology for reproducing corrosion/erosion dynamics. This test equipment was designed in accordance with ASTM D2570-91. Standard Test Method for Simulated Service Corrosion Testing of Engine Coolant. In this case the tank is made of aluminum to simulate an aluminum engine block, the pump is plastic and the test cell is of a design to insure laminar flow.

With regard to velocity, the flow is measured and reported in liters per minute ("lpm") of flow through 1½" fittings. Ball valves are incorporated in both halves of the system, so the system can go as high as approximately 100 LPM and as low as desired by simply closing the valves. The coolant flow can be adjusted so that the test coupons are exposed to an equivalent flow rate per unit surface area as the radiator. The inventive combination of a material with at least two layers, (particularly preferably at least 3 layers) one of which is an inner liner including from 0.7–3.0% Zn and from 0.7–2.0% Mn such that a heat exchanger tube is formed wherein the inner clad is present on the interior of said heat exchange tube is what is responsible for the increase in erosion/corrosion resistance on the tube interior. As such, the heat exchanger products can be adapted to run at higher fluid rates of up to 10 m/sec. or even greater (more often up to 3 m/sec. or up to 1.5 m/sec.) facilitating a downsizing of the heat exchanger units as higher fluid velocities increase the heat exchanger performance.

The effect of two fluid velocities on pit depth of 4 specimens of one material were tested together. For this test, the composition of the fluid used in the test loop was OY water, defined as:
Water based
+1 94.6 ppm Cl⁻ (chloride)
+60 ppm $(SO_4)^{2-}$ (sulfates)
+1 ppm $Cu^{2+}$ (copper (II) ion)
+20 ppm $Fe^{3+}$ (iron (III) ion)

The test temperature was 95° C. (~200° F.)

A comparison was made between an inner liner of Si 0.10–0.40, Fe 0.7 max, Cu 0.05–0.20, Mn 1.0–1.3, Mg 0.05 max, Zn 1.3–1.5, Ti 0.05 max ["Liner A"], a material with no inner liner ["No Liner"], and a material with a prior art inner 7072 of Si 0.2 max, Fe 0.4 max, Cu 0.02 max, Mn 0.10 max, Mg 0.10 max, Zn 0.9–1.3 and Ti 0.05 max ["Liner B"]. At a fluid velocity of approximately 0.94 m/sec., Liner A and material with no liner were tested two times.

There are two accepted methods of pit depth measurement, focal difference (FD) and Image Analysis (ID). Typically FD will give the most accurate results but both tests were conducted for purposes of completeness.

Depth of 5 deepest pits in each sample were measured A total of 20 measurements were performed for each data point.

Test duration=250 hours
Flow rate through test cell Fluid velocity
40 lpm approximately 0.94 m/sec
100 lpm approximately 2.36 m/sec

TABLE 4

(standard core, 4343 clad, and Liner A)
[Sheet thickness ~324 microns]

| | Focal Difference Method | | Image Analysis Method | |
|---|---|---|---|---|
| Fluid velocity m/second | Deepest pit depth (microns) | Average pit depth (microns) | Deepest pit depth (microns) | Average pit depth (microns) |
| 0.94 | 44 | 37 S.D. = 4.2 | 47 | 29 S.D. = 13.0 |
| 0.94 | 34 | 25 S.D. = 6.7 | 25 | 20 S.D. = 3.3 |
| 2.36 | 40 | 26 S.D. = 7.0 | 35 | 21.5 S.D. = 5.5 |

TABLE 5

(standard core and clad 4343, no inner liner)
[Sheet thickness ~318 microns]

| | Focal Difference Method | | Image Analysis Method | |
|---|---|---|---|---|
| Fluid velocity m/second | Deepest pit depth (microns) | Average pit depth (microns) | Deepest pit depth (microns) | Average pit depth (microns) |
| 0.94 | 8 | 5 S.D. = 1.5 | 10 | 8 S.D. = 1.3 |
| 0.94 | Through-thickness | Through-thickness | — | — |

TABLE 5-continued (standard core and clad 4343, no inner liner)
[Sheet thickness ~318 microns]

| | Focal Difference Method | | Image Analysis Method | |
|---|---|---|---|---|
| Fluid velocity m/second | Deepest pit depth (microns) | Average pit depth (microns) | Deepest pit depth (microns) | Average pit depth (microns) |
| | perforation (318) | perforation (318) | | |
| 2.36 | 120 | 55 S.D. = 24.4 | 113 | 77 S.D. = 15.4 |

TABLE 6

(standard core, 4343 clad, and Liner B)
[Sheet thickness ~303 microns]

| | Focal Difference Method | | Image Analysis Method | |
|---|---|---|---|---|
| Fluid velocity ft/second | Deepest pit depth (microns) | Average pit depth (microns) | Deepest pit depth (microns) | Average pit depth (microns) |
| 0.94 m/sec | 38 | 30 S.D. = 4.0 | 39 | 32 S.D. = 4.1 |
| 2.36 m/sec | 76 | 34 S.D. = 13.5 | 53 | 28 S.D. = 6.5 |

From a comparison of the pit depth data of the three materials at 0.94 m/sec. and 2.36 m/sec., Liner A was by far, the best among the three materials tested. The material without any liner was the worst. It is important to analyze the pit depth results at higher fluid velocities since higher fluid velocity (i.e., up to about 3.0 m/sec.) is believed to be responsible for critical damage to heat exchanger units during use (and also since higher flow rates are the trend in the industry). In fact, the inventive Liner A had a maximum pit depth that was only about 35% of the maximum depth of the unlined material, and approximately 50% of the maximum pit depth in the material with Liner B. This means that when compared with AA7072, the inventive material of the present invention has a maximum pit depth at velocities over 0.94 m/sec that is up to 90% less than the maximum depth associated with an inner liner of AA7072 aluminum alloy at the same fluid velocity. The average pit depth of the Liner A material was about 50% of the average of the unlined material, and the Liner A material was about 85–90% of the average shown in the Liner B material. Moreover, as measured using a focal difference method that is well established in the art, the inventive inner liner in one test had an average pit depth of 37 microns and a maximum pit depth of 44 microns at a fluid rate of approximately 0.94 m/sec. In a second test, the inventive inner liner produced an average pit depth of 25 microns and a deepest pit depth of 34 microns. As such, at 0.94 m/sec, materials prepared using an inner liner of the present invention can expect to have a maximum pit depth that ranges from 30–50 microns, in particular from 34–44 microns. Note that typically maximum pit depth used to determine a material's suitability for a particular end use since a final product such as a heat exchanger or the like will begin to leak when only one pit extends through the surface.

Figure 8:
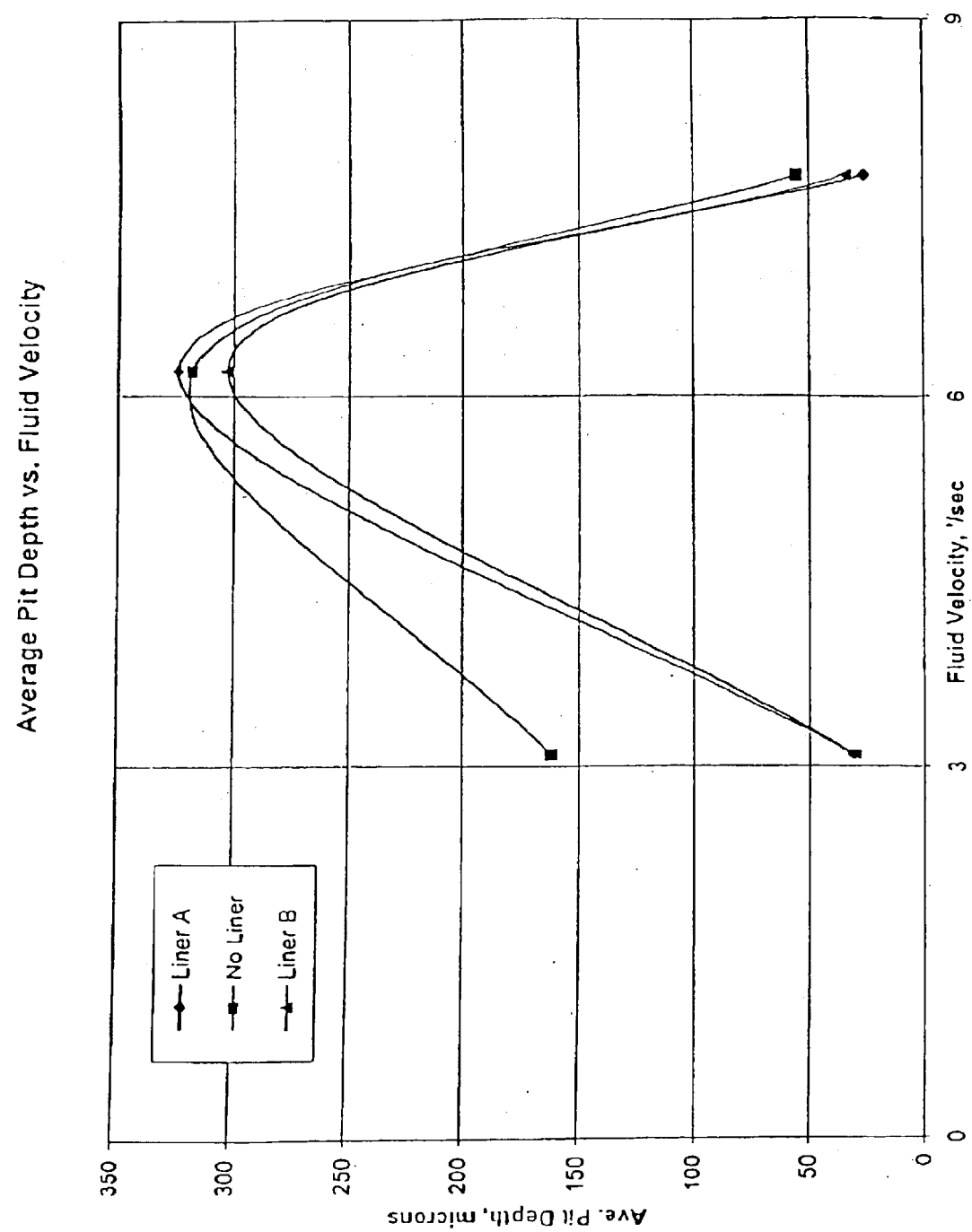
FIGS. 8 and 9 show graphical representations of typical reduction in corrosion/erosion obtained by the present invention as measured by average pit depth and maximum pit depth.
Figure 9:
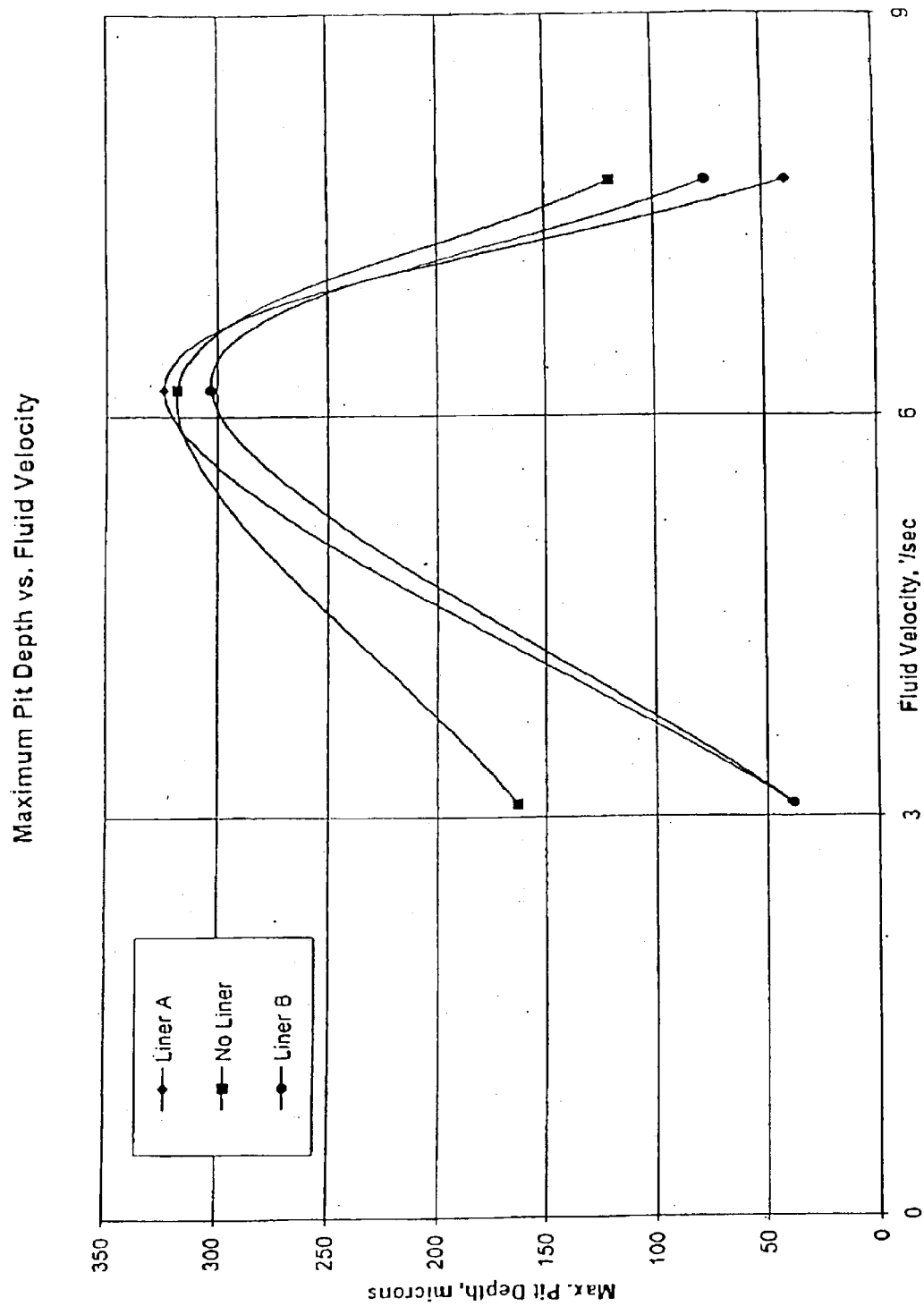

For fluid rates of 2.36 m/sec, the maximum pit depth of materials prepared using the inventive inner liner will typically range from 10–50 microns, in particular, from 30–50 microns, and in one embodiment, about 40 microns. The average pit depth at 2.36 m/sec will typically range from 10–30 microns, and in particular about 26 microns. It is notable that materials prepared using the present inner liner have virtually little change in the maximum pit depth or the average pit depth over flow rates from 0.94 m/sec. to 2.36 m/sec. However, materials with no liner or materials with AA7072 as an inner liner have a much greater maximum and average pit depth at rates of 2.36 m/sec as compared with 0.94 m/sec. It is also notable that materials prepared using the inventive inner liner have an average pit depth at 2.36 m/sec. That is less than at 0.94 m/sec. This is completely unexpected since one of skill in the art would have thought that the average pit depth would increase with increased flow rate (see Table 5 and Table 6). This is not the case when an inner liner of one embodiment of the present invention is employed. See FIGS. 8 and 9 that exemplify results achieved according to the present invention in terms of the effect of increasing flow rate on pit depth.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

As used herein and in the following claims, articles such as "the", "a" and "an" can connote the singular or plural.

All documents referred to herein are specifically incorporated herein by reference in their entireties.

What is claimed:

1. A brazing sheet comprising an aluminum 3xxx series core alloy wherein at least one side thereof is provided with an aluminum clad material comprising from 0.7–2.0% Mn and 0.7–3.0% Zn, wherein said clad is capable of being used as the inner-liner of a heat exchanger tube product.

2. A brazing sheet of claim 1, wherein one side of said core is provided a material that comprises from 0.7–2.0% Mn and 0.7–3.0% Zn and the other side of said core is provided with an aluminum alloy comprising at least 5.5% Si.

3. A heat exchanger tube prepared from a brazing sheet according to claim 1.

4. A heat exchanger prepared using a brazing sheet according to claim 1.

5. A heat exchanger as claimed in claim 4, that shows substantially no difference in maximum and/or average pit depth after being exposed to fluid velocities from 0.94 m/second–2.36 m/second for 250 hours.

6. Tube stock prepared from a sheet according to claim 1.

7. Tube stock according to claim 6, wherein said tube stock will have a maximum pit depth of up to 40 microns when exposed to a fluid at a velocity of 2.36 m/second for 250 hours.

8. A brazing sheet according to claim 1 that has a thickness of 0.007"–0.015".

9. A method for reducing corrosion and/or erosion associated with fluid velocity in the interior of heat exchange tubes comprising: obtaining a brazing sheet material that includes an inner clad layer including from 0.7–3.0% Zn and form 0.7–2.0% Mn and forming a heat exchange tube wherein said inner clad is present on the interior of said exchanger tube.

10. A method according to claim 9, wherein said method imparts a reduction from between 10% to 60% of the erosion/corrosion compared to AA7072 as measured by average pit depth in microns for fluid velocity rates up to 5.0 m/second.

11. A method according to claim 9, wherein said method imparts a reduction from between 10% to 60% of the erosion/corrosion compared to AA7072 as measured by average pit depth in microns for fluid velocity rates up to 5.0 m/second.

12. A method according to claim 9, wherein said method imparts a reduction from between 10% to 60% of the erosion/corrosion compared to AA7072 as measured by maximum pit depth in microns for fluid velocity rates up to 5 m/second.

13. A method according to claim 9, wherein said brazing sheet material includes an outer clad layer comprising at least 5.5% Si.

14. A heat exchanger prepared according to the method of claim 9.

15. A heat exchanger according to claim 14, that has been formed from a brazing sheet having a size of 0.007"–0.015".

* * * * *

UNITED STATES PATENT AND TRADEMARK OFFICE
CERTIFICATE OF CORRECTION

PATENT NO. : 6,911,267 B1
APPLICATION NO. : 10/658791
DATED : June 28, 2005
INVENTOR(S) : Goodrich et al.

It is certified that error appears in the above-identified patent and that said Letters Patent is hereby corrected as shown below:

On the title page (56), insert the following:

U.S. PATENT DOCUMENTS

| Document Number<br>Number-Kind Code[2] (if known) | Publication Date<br>MM-DD-YYYY | Name of Patentee or Applicant of Cited Document |
|---|---|---|
| US-5,292,595 | 03-08-1994 | Yamauchi et al |
| US-3,809,155 | 05-07-1974 | Anthony et al |
| US-3,872,921 | 03-25-1975 | Anthony et al |
| US-3,878,871 | 04-22-1975 | Anthony et al |
| US-4,093,782 | 06-06-1978 | Anthony et al |
| US-4,167,410 | 09-11-1979 | Anthony et al |
| US-4,203,490 | 05-20-1980 | Terai et al |
| US-4,209,059 | 06-24-1980 | Anthony et al |
| US-4,244,756 | 01-13-1981 | Tanabe et al |
| US-4,357,397 | 11-02-1982 | Baba et al |
| US-4,410,036 | 10-18-1983 | Kanada et al |
| US-4,499,051 | 02-12-1985 | Tong |
| US-4,511,632 | 04-16-1985 | Toma et al |
| US-4,560,625 | 12-24-1985 | Kaifu et al |
| US-4,615,952 | 10-07-1986 | Knoll |
| US-4,749,627 | 06-07-1988 | Ishikawa et al |
| US-4,632,885 | 12-30-1986 | Tanabe et al |
| US-4,911,351 | 03-27-1990 | Ishikawa et al |
| US-4,982,784 | 01-08-1991 | Rhodes |
| US-5,021,106 | 06-04-1991 | Iwai et al |
| US-5,176,205 | 01-05-1993 | Anthony |
| US-5,302,342 | 04-12-1994 | Kawabe et al |
| US-5,476,725 | 12-19-1995 | Papich et al |
| US-5,744,255 | 04-28-1998 | Doko et al |

UNITED STATES PATENT AND TRADEMARK OFFICE
CERTIFICATE OF CORRECTION

PATENT NO. : 6,911,267 B1
APPLICATION NO. : 10/658791
DATED : June 28, 2005
INVENTOR(S) : Goodrich et al.

It is certified that error appears in the above-identified patent and that said Letters Patent is hereby corrected as shown below:

On the title page (56), insert the following:

FOREIGN PATENT DOCUMENTS

| Foreign Patent Document<br>Country Code-Number-Kind Code (if known) | Publication Date<br>MM-DD-YYYY | Name of Patentee or Applicant of Cited Document |
|---|---|---|
| JP-11061305 | 03/1999 | Furukawa Elec. Co. Ltd. |
| WO-00/63008 | 10-26-2000 | Hurd et al |
| JP-2000297998 | 10-24-2000 | Yoshiaki |
| JP-11061306 | 03-05-1999 | Koji |
| JP-10158769 | 06-16-1998 | Yutaka |
| JP-08302439 | 11-19-1996 | Ken |

OTHER PUBLICATIONS

NON PATENT LITERATURE DOCUMENTS

| Examiner Initials | Cite No. | Include name of the author (in CAPITAL LETTERS), title of the article (when appropriate), title of the item (book, magazine, journal, serial, symposium, catalog, etc.), date, page(s), volume-issue number(s), publisher, city and/or country where published | T² |
|---|---|---|---|
| | CA | Ortnas, et al., "Sagging Resistance of Braze Clad Fin Material for Evaporators and Condensers", SAE International Congress & Exposition, Detroit, MI, No. 960246, pp.11-16 (1998). (no month given) | |
| | CB | Garcia et al., "Internal Corrosion/Erosion Testing of Welded Aluminum Radiator Tubes for Passenger Cars and Heavy Duty Trucks", ImechE. PP. 257-265 (1995). (no month given) | |
| | CC | Hindin, "Interim Report on Internal Corrosion Resistance of Braze Sheet Alloys and CA15 Radiators", Battelle, pp. 1-36 (11/1996). | |
| | CD | Stauver, "Corrosion Potential Measurements of Radiator Tube Alloys CA15, CA18, CA75, MD362", Touchstone Research Laboratory (12/1994). | |
| | CE | Hindin, "Internal Corrosion Resistance of Braze Tube Alloys", Battelle, pp. 1-33 (12/1995). | |
| | CF | Hindin, "Internal Corrosion Resistance of Braze Sheet Alloys and CA15 and CA73 Radiators", Battelle, pp. 1-41 (5/1997). | |

Signed and Sealed this

Twenty-eighth Day of November, 2006

JON W. DUDAS
*Director of the United States Patent and Trademark Office*